US008220017B1

(12) United States Patent
Dan et al.

(10) Patent No.: US 8,220,017 B1
(45) Date of Patent: Jul. 10, 2012

(54) SYSTEM AND METHOD FOR PROGRAMMATIC GENERATION OF CONTINUOUS MEDIA PRESENTATIONS

(75) Inventors: Asit Dan, West Harrison, NY (US); Jai Prakash Menon, Peekskill, NY (US); Junehwa Song, Mt. Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/070,831

(22) Filed: Apr. 30, 1998

(51) Int. Cl.
*H04N 7/173* (2011.01)
*H04N 5/445* (2011.01)
*G06F 9/45* (2006.01)
*G06F 15/00* (2006.01)
*G06F 17/30* (2006.01)

(52) U.S. Cl. ........... 725/32; 715/201; 715/203; 715/723

(58) Field of Classification Search ............ 725/28, 725/135–142, 109–113, 9–16, 45–46, 32–35, 725/37; 715/500.1, 704, 78, 732, 178, 255, 715/718, 723, 202, 209, 254, 203; 348/463, 348/473; 386/40; 345/721, 723
See application file for complete search history.

(56) References Cited

U.S. PATENT DOCUMENTS

| | | | | |
|---|---|---|---|---|
| 5,388,197 A | * | 2/1995 | Rayner | 715/723 |
| 5,410,344 A | * | 4/1995 | Graves et al. | 725/46 |
| 5,550,735 A | * | 8/1996 | Slade et al. | 364/401 |
| 5,614,940 A | * | 3/1997 | Cobbley et al. | 725/138 |
| 5,659,790 A | * | 8/1997 | Kim et al. | 715/202 |
| 5,664,206 A | * | 9/1997 | Murow et al. | 704/8 |
| 5,740,388 A | * | 4/1998 | Hunt | 345/723 |
| 5,758,093 A | * | 5/1998 | Boezeman et al. | 709/249 |
| 5,805,156 A | * | 9/1998 | Richmond et al. | 345/328 |
| 5,815,717 A | * | 9/1998 | Stack | 717/105 |
| 5,818,441 A | * | 10/1998 | Throckmorton et al. | 345/717 |
| 5,826,102 A | * | 10/1998 | Escobar et al. | 707/500.1 |
| 5,848,352 A | * | 12/1998 | Doughrty et al. | 725/136 |
| 5,861,880 A | * | 1/1999 | Shimizu et al. | 715/500.1 |
| 5,931,908 A | * | 8/1999 | Gerba et al. | 709/219 |
| 6,040,841 A | * | 3/2000 | Cohen et al. | 345/723 |
| 6,118,444 A | * | 9/2000 | Garmon et al. | 715/723 |
| 6,119,154 A | * | 9/2000 | Weaver et al. | 725/87 |
| 6,173,317 B1 | * | 1/2001 | Chaddha et al. | 709/219 |
| 6,257,774 B1 | * | 7/2001 | Stack | 717/110 |

(Continued)

FOREIGN PATENT DOCUMENTS

| | | |
|---|---|---|
| JP | 7210652 | 8/1995 |
| JP | 8180037 | 7/1996 |

OTHER PUBLICATIONS

Song et al., "Interactive Authoring of Multimedia Documents", Proc. of IEEE Symposium on Visual Languages, p. 276-283, 1996.

(Continued)

*Primary Examiner* — Pankaj Kumar
*Assistant Examiner* — Reuben M Brown
(74) *Attorney, Agent, or Firm* — Gibb I.P. Law Firm, LLC

(57) ABSTRACT

A method of dynamically generating a presentation sequence from a plurality of authored presentation documents includes the steps of receiving the plurality of authored presentation documents from a plurality of data sources; applying the plurality of authored presentation documents to a set of presentation rules; and generating the presentation sequence in response to the applying step.

14 Claims, 16 Drawing Sheets

U.S. PATENT DOCUMENTS

| | | | |
|---|---|---|---|
| 6,260,194 B1 * | 7/2001 | Shiels et al. | 725/134 |
| 6,298,482 B1 * | 10/2001 | Seidman et al. | 725/101 |
| 6,317,885 B1 * | 11/2001 | Fries | 725/109 |
| 6,597,405 B1 * | 7/2003 | Iggulden | 348/553 |
| 6,654,930 B1 * | 11/2003 | Zhou et al. | 715/202 |
| 6,792,618 B1 * | 9/2004 | Bendinelli et al. | 725/112 |
| 6,810,503 B1 * | 10/2004 | David et al. | 715/500.1 |
| 7,272,780 B2 * | 9/2007 | Abbott et al. | 715/203 |
| 2002/0080159 A1 * | 6/2002 | Montgomery et al. | 345/704 |

OTHER PUBLICATIONS

Chao-Hui Wu et al., "Querying Multimedia Presentations", Proc. of IEEE Conference on Protocols for Multimedia Systems-Multimedia Networking, p. 64-73, 1997.

Yun et al., "Synchronization Attributes and Rules of Active Object-Oriented DataBase for Multimedia Presentation", Proc. of the $4^{th}$ International Conference on Database Systems for Advanced Applications (DASFAA), World Scientific Press, pp. 358-363, 1995.

R. Macneil, "Generating Multimedia Presentations Automatically Using TYRO, The Constraint, Case-Based Designers Apprentice", Proc. of IEEE Workshop on Visual Languages, pp. 74-79, 1991.

Blakowski et al., "A Media Synchronization Survey: Reference Model, Specification, and Case Studies", IEEE Journal on Selected Areas in Communications, IEEE Inc., vol. 14, No. 1, pp. 5-35, 1996.

Shih et al., "IMMPS: A Multimedia Presentation Design System," IEEE Multimedia, IEEE Computer Society, vol. 4, No. 2, pp. 67-78, 1997.

* cited by examiner

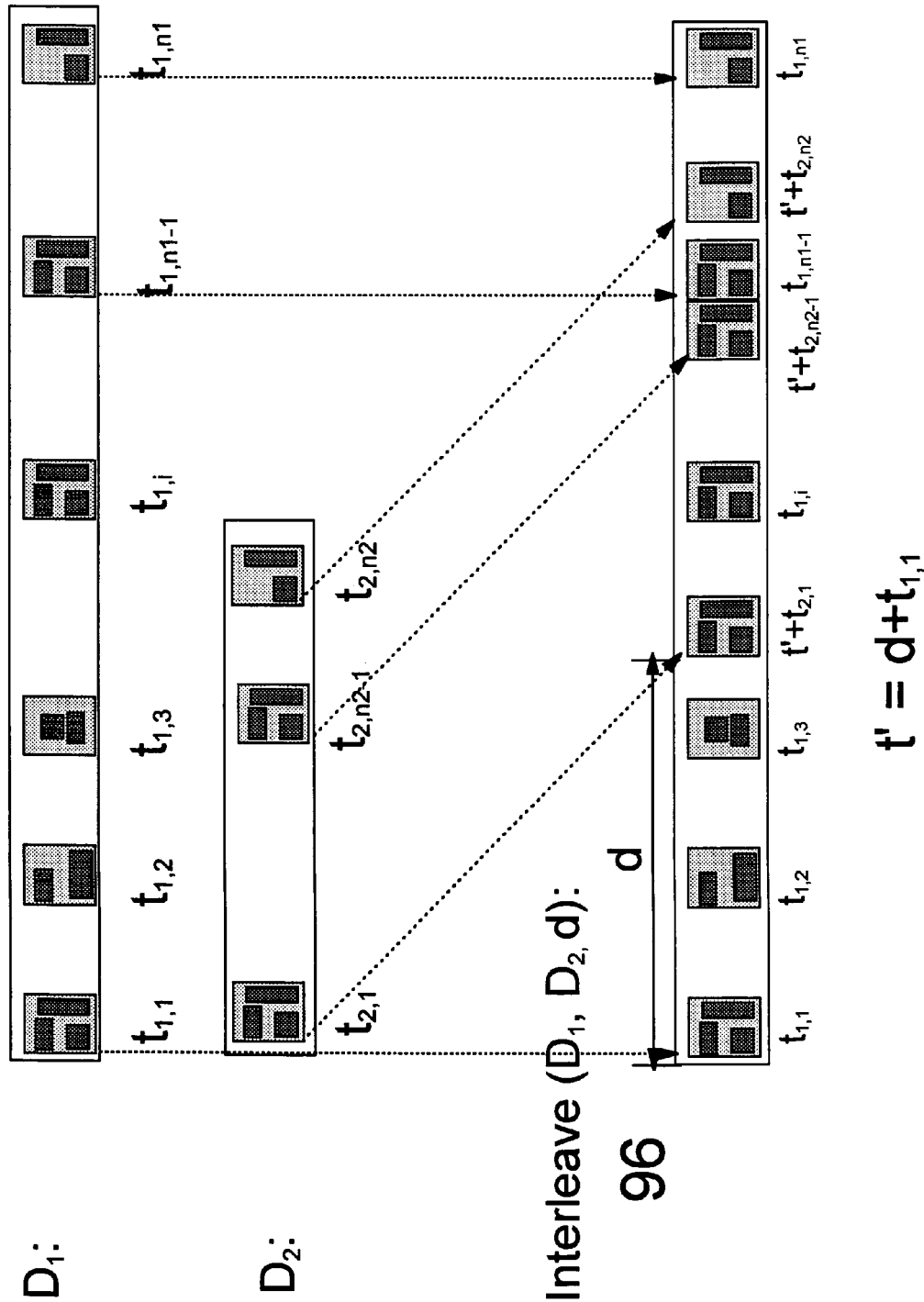

SYSTEM AND METHOD FOR PROGRAMMATIC GENERATION OF CONTINUOUS MEDIA PRESENTATIONS

FIELD OF THE INVENTION

This invention relates to the field of composition and presentation of multimedia. More specifically, the invention relates to the programmatic generation of multimedia presentation sequences.

BACKGROUND OF THE INVENTION

A block diagram of a conventional distributed multimedia presentation environment is shown in FIG. 1. A multimedia system in such an environment can produce a composed multimedia document (not shown) which is displayed on a presentation device 11, such as a television or computer monitor. First, various presentation documents 16, 17 are pre-composed by authors. This task of generating the presentation documents is called authoring. Many different types of documents can be authored, e.g., composition of video presentation 16 or composition of Web pages 17. Once these documents are prepared, they are stored in various data storage devices 14, 15 such as hard disks, digital video disks or storage devices of a satellite broadcasting company. Upon a user's request for presentation of a document, the presentation documents are delivered through the network 13 to the presentation device 11 for presentation. This is referred to as the "pull" mode. The presentation can also be sent by the storage devices 14, 15 pro-actively (e.g., by the broadcasting companies) to users without any explicit request via the network 13 or otherwise. This is referred to as the "push" mode.

Therefore, conventionally, multimedia presentation materials are generated before the presentation, i.e., at an authoring time. Once generated, presentation is accomplished exactly as the presentation materials are pre-composed. The user's capability to interact with the presentation is limited through interaction with the control panels 12 on the presentation device 11. Typical examples of the possible interactions provided by these control panels 12 include selection of different materials (channels or URLs), fast forward, fast reverse, pause, etc. However, in prior art systems, no dynamic changes to the presentation materials are supported.

A somewhat enhanced interaction capability is provided by the 3D object model. A pre-specified interaction semantic is built into the object. For example, PanoramIX, an image-based rendering software from IBM (www.software.ibm.com/net.media), uses environment maps (e.g., cylinders with tops/bottoms or polyhedral approximations of spheres) to render the background from a fixed viewpoint that does not translate. It supports smooth rotation and continuous zoom of the view. PanoramIX also allows pre-composition of a complex scene with embedded sprites, audio segments, video clips and 3D objects. It uses a control file that is pre-defined during scene authoring, using a special authoring tool.

Another example of a prior art system that uses pre-composed complex scenes is contained in the specifications of the MPEG-4 standard. MPEG-4 employs a BIFS (Binary Information for Scenes) composite file that describes a scene hierarchy, along the lines of VRML (Virtual Reality Modelling Language) scene graphs. Leaf nodes of the graph are AVOs (Audio-Visual Objects) that could be a video or audio or a 3D object or any other component media type. In fact, PanoramIX may be viewed as one instance of the MPEG-4 specification.

While they do provide some added interaction capability, these systems still fall short of providing the full ability to dynamically alter presentations after authoring.

SUMMARY OF THE INVENTION

The present invention provides a method by which a user can programmatically compose presentation materials which have been authored. First, users compose different presentations by applying dynamic synchronization, placement and selection of media stream segments under the control of a program. In contrast to pre-composed presentations where the selection of media segments and the synchronization and placement of those media segments are predetermined (e.g., MPEG-2 video), in the present invention, the selection, synchronization (for example, the determination of starting times for each media segment and delay insertion) and placements (in the display window) are controlled dynamically through the composition program. Second, the composition programs themselves are rule-based and event-driven, and therefore can be dynamically altered. Third, the program that controls composition may be downloaded or pre-resident at the presentation site. Additionally, various commands (understood by this program) may also be streamed to the program via separate logical channel(s). Finally, the composition can be accomplished both at the client site or at the server site based on user interactions at the client as well as network and server load.

Specifically, a method of dynamically generating a presentation sequence from a plurality of authored presentation documents is provided including the steps of receiving the plurality of authored presentation documents from a plurality of data sources, applying the plurality of authored presentation documents to a set of presentation rules, and generating the presentation sequence in response to the applying step.

Preferably, the applying step includes the steps of testing for satisfied rule conditions and applying the plurality of authored presentation documents to a set of presentation rules in response to the satisfied rule conditions. In addition, it is preferable that the method include the step of receiving user input and wherein the generating step includes the step of generating the presentation sequence in response to the received user input. The method preferably includes the further step of modifying the set of presentation rules in response to the received user input.

The method can further include the step of sensing an external event, wherein the generating step includes the step of generating the presentation sequence in response to the sensed external event. Additionally, the method can further include the step of modifying the set of presentation rules in response to the sensed external even or in response to the received presentation documents.

The method can further include the steps of receiving meta data from the data sources and modifying the set of presentation rules in response to the received meta data.

The authored presentation documents are preferably authored presentation sequences and the generated presentation sequence is preferably a composite presentation sequence.

A method for programmatic generation of continuous multimedia presentations by a station capable of receiving at least one presentation and sensed events is also provided including the steps of maintaining a library of rules, receiving at least one presentation; selecting at least one event to be sensed; receiving the event, testing each rule in the library for each received event; and optionally applying each rule to the presentation for each received event in response to the testing step to modify the presentation or to generate a new presentation.

A method for dynamically composing a presentation from a plurality of multimedia components is also provided including the steps of selecting one or more of the multimedia components to be identified as an initial portion of the presentation; programmatically selecting one or more other multimedia components to be identified as a subsequent portion of the presentation; disposing the subsequent portion with or following the initial portion; and synchronizing the selected components to form the presentation.

Preferably, this method further includes the step of presenting the presentation. The multimedia components can be continuous media components or non-continuous media components. They can also be audio or video components or text or image components.

It is preferable that the programmatically selecting step is responsive to input parameters, a past presentation history or a current state and to line content or meta-data.

A program storage device, readable by a machine, tangibly embodying a program of instructions executable by the machine to perform method steps for dynamically generating a presentation sequence according to the above-referenced method steps is also provided.

A programmatic presentation generator into which presentation documents are received is provided, including a rule base; a program state; and a computation engine, wherein the engine receives rule data from the rule base and state data from the program state and generates a presentation sequence responsive to the presentation documents, the rule data and state data.

A set top box for receiving channels and sending presentation sequences to a digital television is also provided, including the programmatic presentation generator of the present invention.

Finally, a television set for receiving channels and generating presentation sequences is provided including the programmatic presentation generator of the present invention.

BRIEF DESCRIPTION OF THE DRAWINGS

Further objects, features and advantages of the present invention will become apparent from a consideration of the following detailed description of the invention when read in conjunction with the drawing figures, in which:

FIG. 9, FIG. 9A and FIG. 9B are block diagrams for the operations to define and change the temporal properties of a composite presentation sequence using multiple presentation sequences according to the present invention.

DETAILED DESCRIPTION OF THE INVENTION

Figure 1:
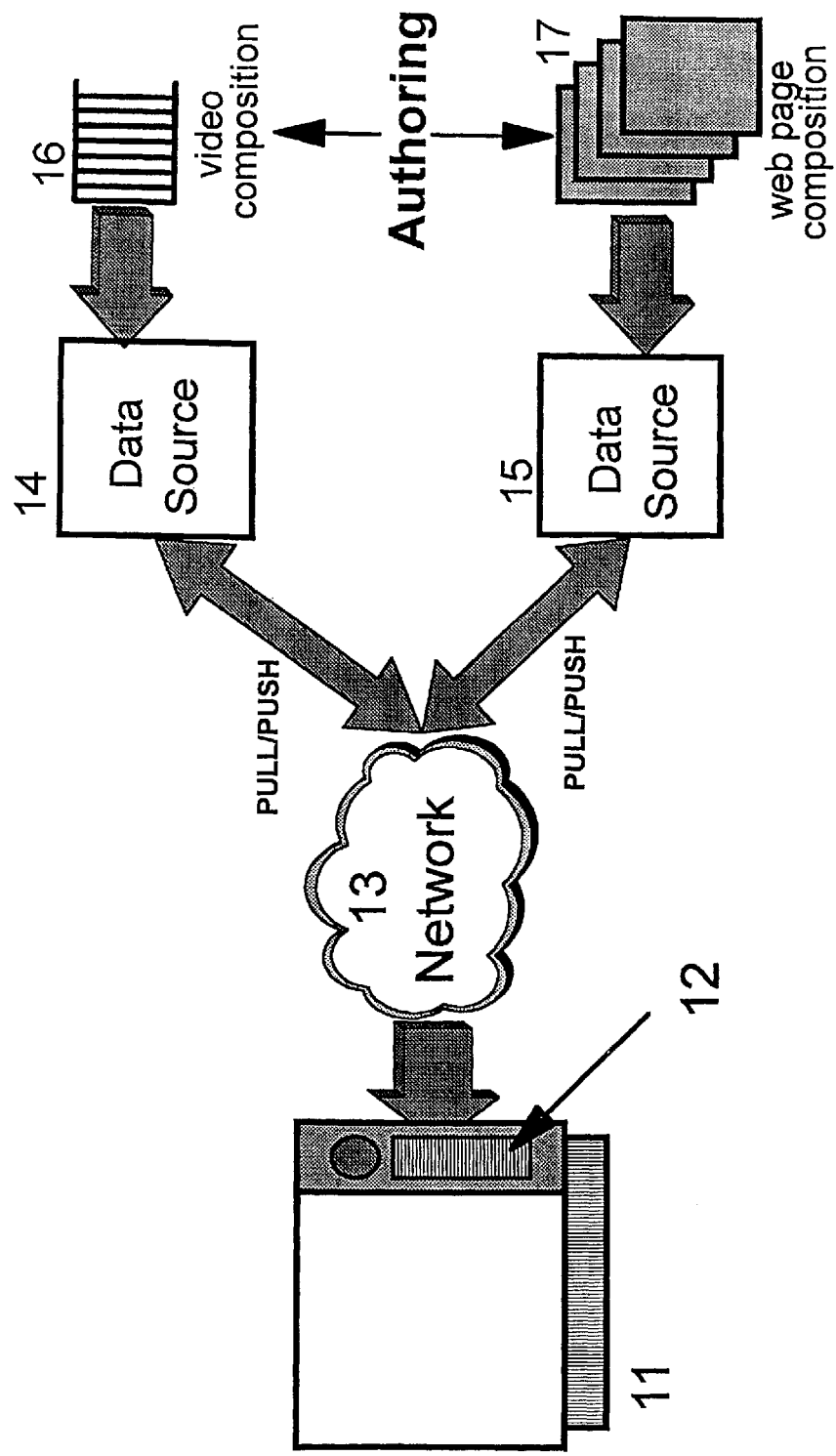
FIG. 1 is a block diagram of a conventional distributed multimedia presentation environment.
Figure 1A:
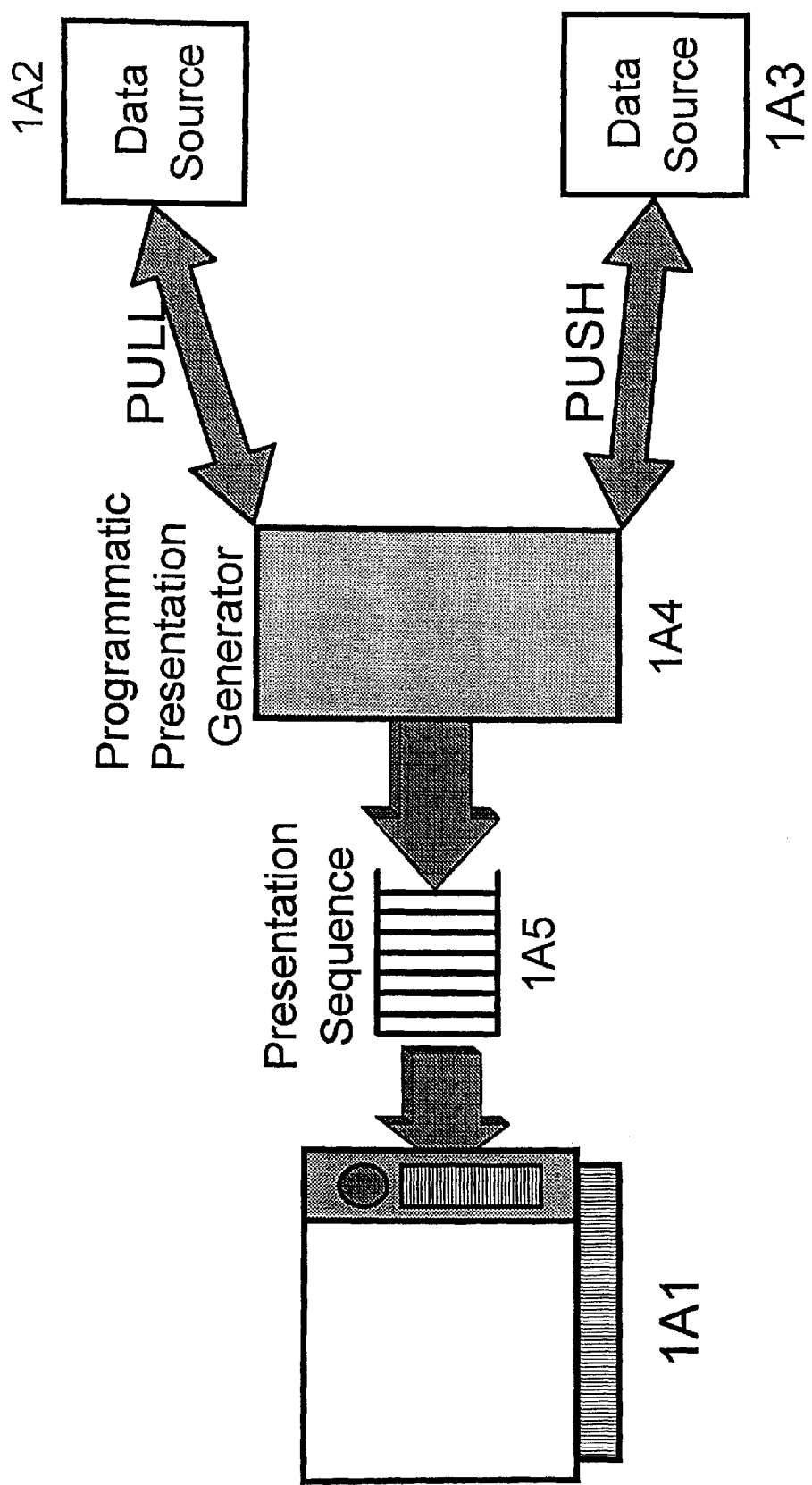
FIG. 1A is a block diagram of a presentation environment incorporating the programmatic presentation generator of the present invention.

FIG. 1A is a block diagram of a distributed multimedia presentation environment utilizing the programmatic presentation generator of the present invention. In FIG. 1A, a presentation device 1A1, such as a TV or computer monitor, presents a presentation sequence 1A5 generated by the programmatic presentation generator 1A4. This programmatic presentation generator 1A4 can generate the presentation sequences using the data pushed from data source 1A3 or it can pull the data from the data source 1A2 when required. These data sources can include a hard disk, digital video disk, satellite or TV broadcasting company. The programmatic presentation generator 1A4 according to the present invention permits a presentation sequence, such as TV programs, MPEG sequences, etc., to be dynamically generated or, once generated, to be dynamically modified reflecting user input, presentation rules and external events.

This programmatic presentation generator 1A4 could be incorporated on different software components. For example, it can be incorporated as part of the set-top box environment or executed as part of the server software.

Figure 1B:
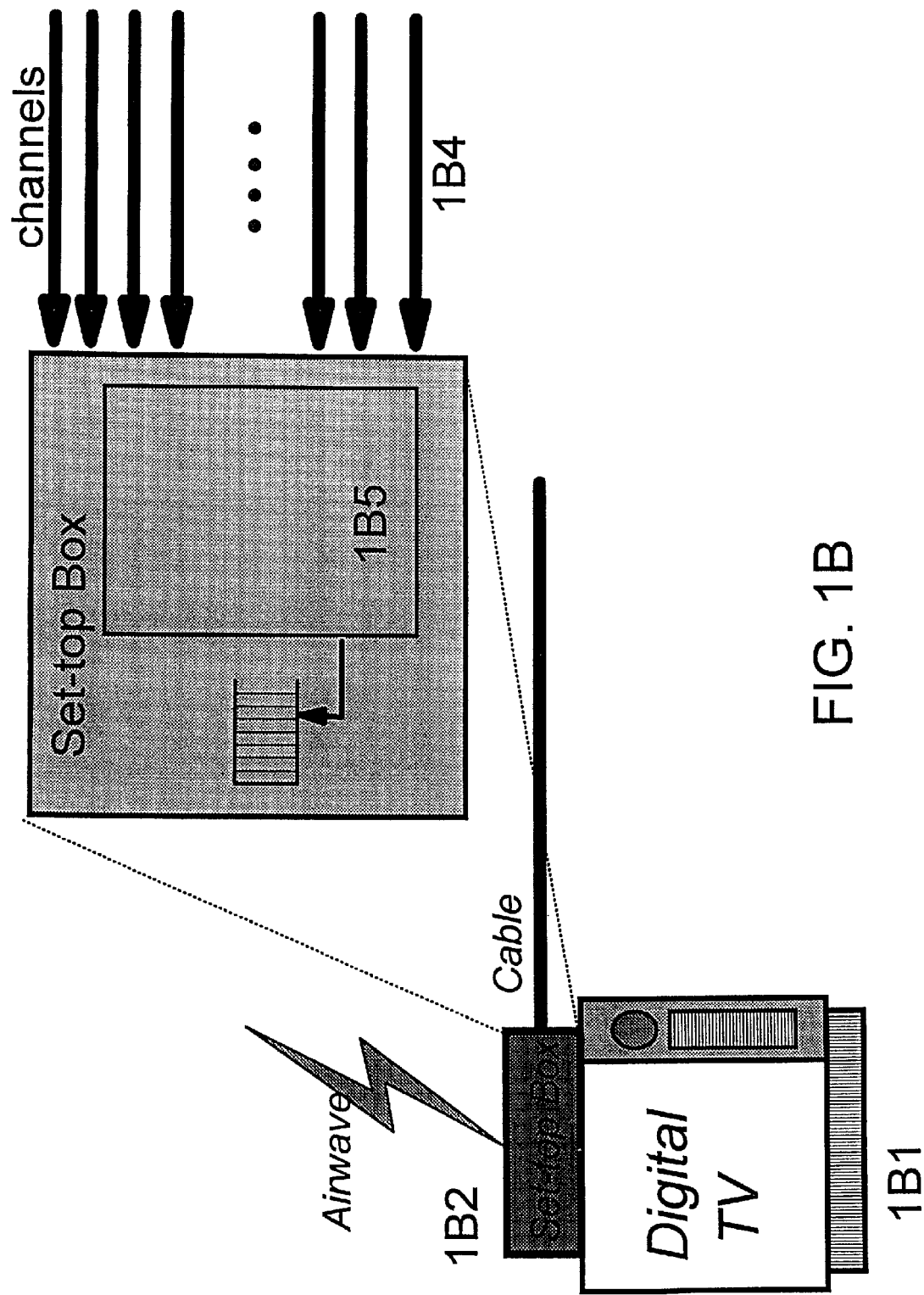
FIG. 1B is a block diagram which shows one embodiment of the programmatic presentation generator of FIG. 1A incorporated as part of a set-top box.

FIG. 1B shows the block diagram of a programmatic presentation generator 1B5 used in a set-top box 1B2. A television 1B1 receives the presentation sequences from a set-top box 1B2. Alternately, one skilled in the art can appreciate that the programmatic presentation generator can be located in the television 1B1 itself, assuming the functionality of the set-top box 1B2 is incorporated therein. In prior art systems, users could only select a channel of interest out of the multiple incoming channels 1B4. However, by placing the programmatic presentation generator 1B5 in a set-top box 1B2 (or in a television), users can dynamically modify or compose a presentation sequence using the multiple incoming channels 1B4. The components of a programmatic presentation generator 1B5 (i.e, rule base, engine, program state) are described hereinbelow.

Figure 1C:
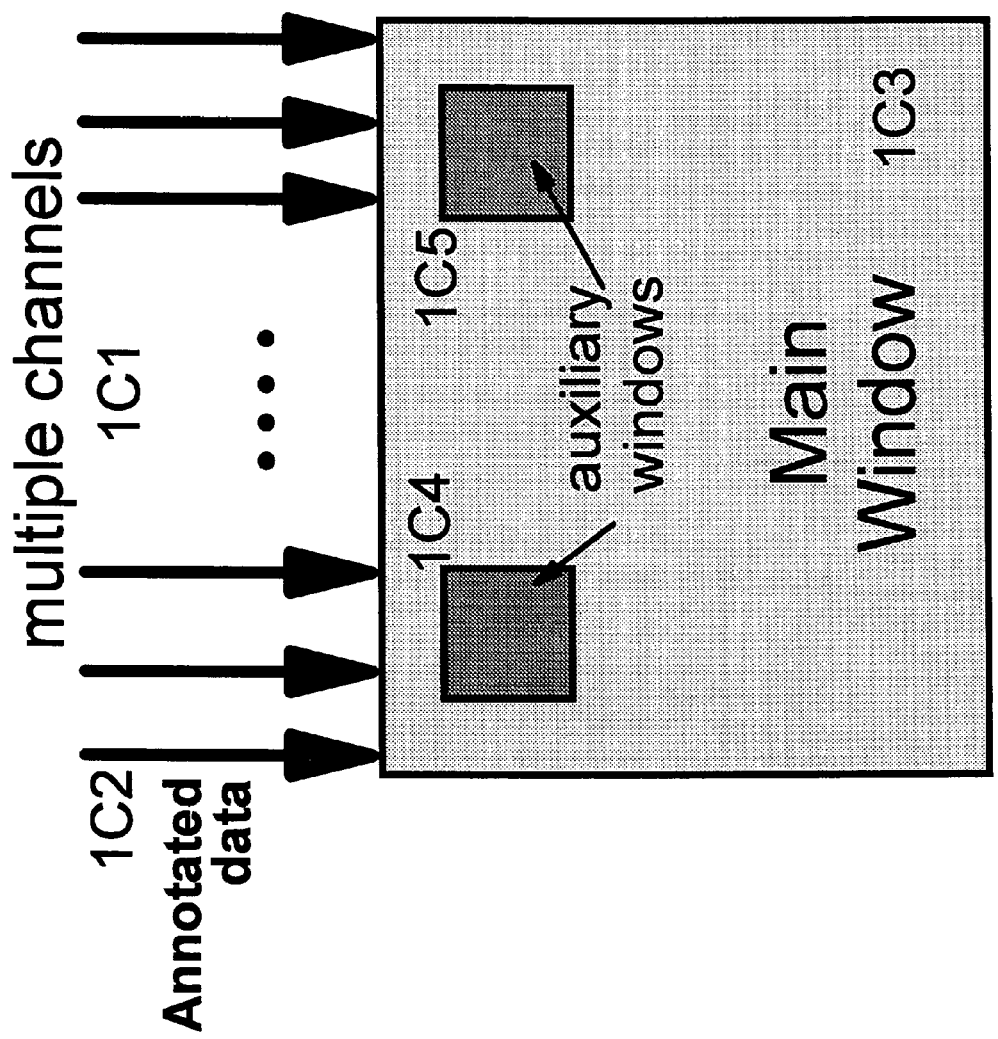
FIG. 1C is a block diagram showing an Intelligent TV Guide example of using the programmatic presentation generator of the present invention.

FIG. 1C is a block diagram which shows an Intelligent TV Guide as an example using the programmatic presentation generator of the present invention. Multiple channels 1C1 are connected to a TV 1C3. Through certain channels 1C2, additional meta (command) data can also be transmitted. Using the programmatic presentation generator of the present invention, a user can watch the programs in which he is most interested. This selection could be specified using rule-based programs as described hereinbelow. This program could use simple keyword matching, similar to that used in an internet search engine, over the meta data. For example, a program could be added to the rule-base (described hereinbelow) so that automatic selection of the contents is executed every 30 minutes. As an example, the rules can be specified in the following way: First, repeated selection of the same content should be avoided. Second, violent programs may not be selected. Also, if a new interesting program shows up on the display and if it is within the threshold of preference (i.e., evaluated via a user-defined function as sufficiently interesting), the next two best programs are shown in the top corner windows 1C4, 1C5 for 2 minutes. This functionality significantly assists a user with the task of choosing a program to view.

Figure 1D:
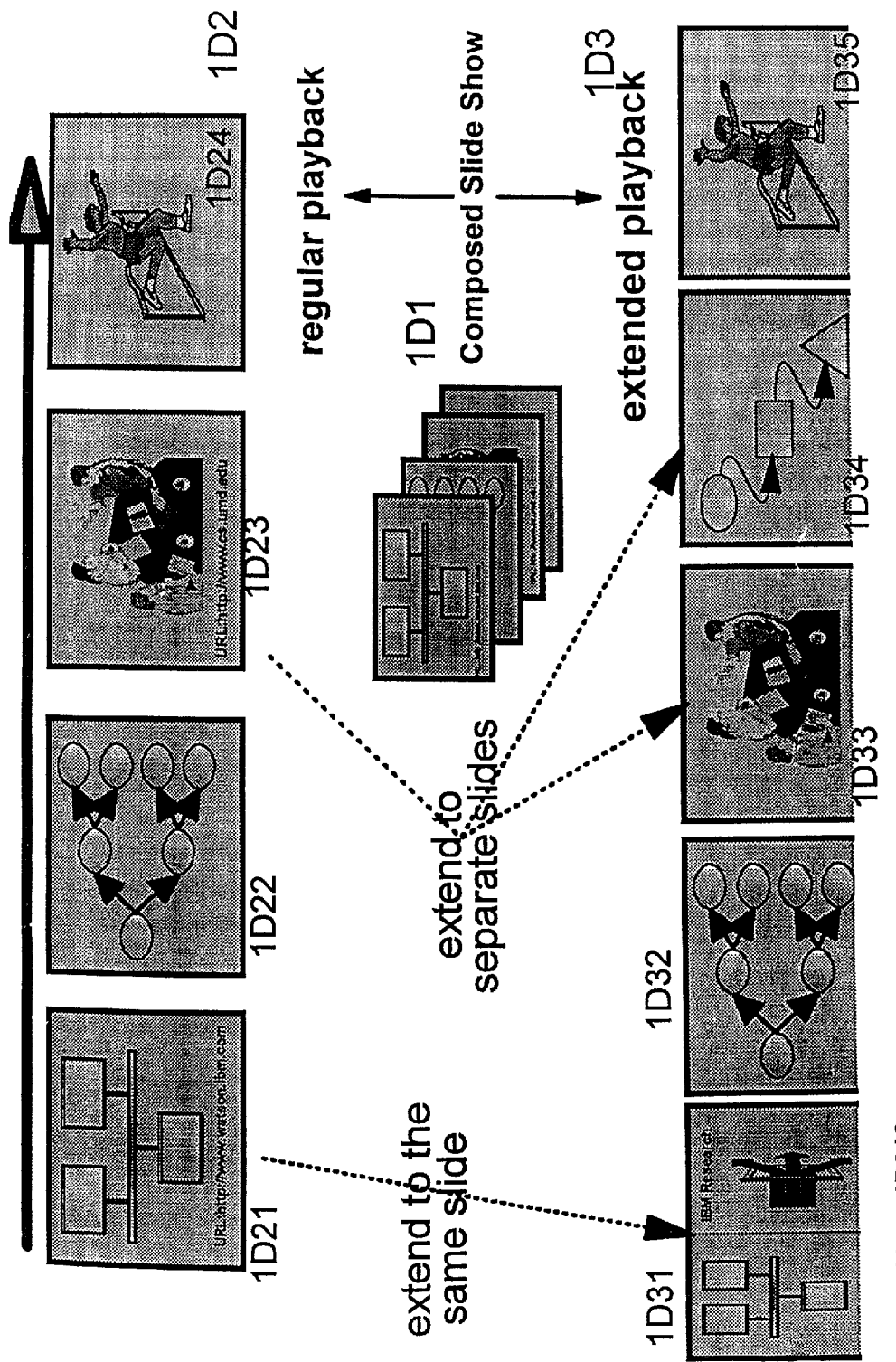
FIG. 1D is a block diagram showing an intelligent slide show example of using the programmatic presentation generator of the present invention.

FIG. 1D is a block diagram which shows an Intelligent Slide Show as another example of an application of the programmatic presentation generator of the present invention. The composed, original slide show 1D1 consists of 4 slides (1D21 through 1D24). Two of the slides (1D21 and 1D23) include URLs. The slide show 1D1 was designed to be played back in the regular playback order shown in 1D2, i.e., in the order of 1D21, 1D22, 1D23 and 1D24. A different slide show can be generated using the programmatic presentation generator of the present invention as shown in 1D3. The new (extended playback) slide show 1D3 has been generated by extending 1D1. In the slide show 1D3, the contents of the URLs included in the original slides (1D21 and 1D23) are retrieved and included as parts of the slides. The inclusion of the pages referenced by the URLs can be accomplished in various ways. For example, the slide 1D21 was extended such that the referenced URL page 1D312 is included as a part of the same slide as page 1D311 as shown in 1D31. In contrast, the referenced URL page on slide 1D23 is included as a separate slide 1D34.

Figure 2:
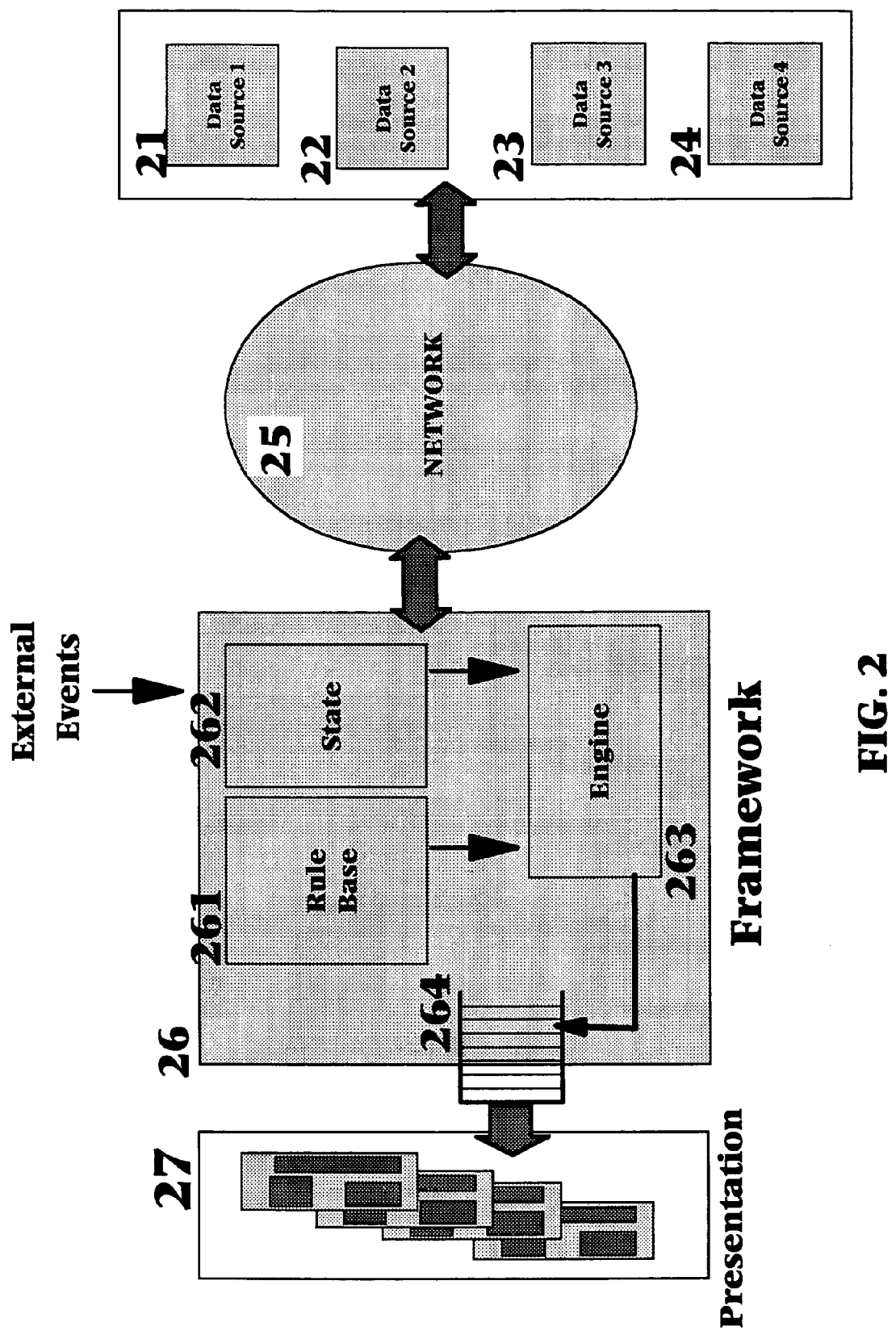
FIG. 2 is a block diagram of the presentation environment of FIG. 1A showing the framework of the programmatic presentation generator according to the present invention.

FIG. 2 is a diagram which shows a more detailed view of the programmatic presentation generator according to the present invention along with a distributed multimedia presentation environment. Data sources 21, 22, 23, 24 and network 25 are the same as those in FIG. 1. The framework 26 of the programmatic presentation generator is composed of a rule-base 261, a presentation state 262 and a computation engine 263.

The rule-base 261 is composed of a set of rules to be described hereinbelow. The rule-base 261 can be modified (i.e., adding, deleting or modifying one or more rules) in several ways. First, modification can occur by local user input. Second, one or more existing rules can implicitly modify the rule-base. Finally, data contained in the presentation sequence(s) received from the data source(s) or meta data received from the data source(s) in a separate logical channel (whether initiated by a user pull command or by a data source push command) can alter the rule-base.

The presentation state 262 consists of a presentation history and a set of state variables. The presentation history includes the history of such information as presentation contents, user interactions and external events up to a certain point in time. A state variable is a program-defined variable which serves to mark and represent the status of a presentation so that it can be referred within a program (rules).

The computation engine 263 includes computational logic which monitors the presentation state 262, interprets the rule base 261 and sensed external events, and modifies the presentation sequence, thereby generating a new presentation sequence 264 and a resulting presentation 27. The sensed external events can include input timing parameters and user inputs. Upon each sensed external event, the engine 263 serializes the rules in the rule-base 261, and applies each rule to the current presentation sequence. That is, given a rule-base $RB=\{R_1, R_2, \ldots, R_n\}$, where $R_i$ is a rule, and the current presentation sequence P, the engine generates the new presentation sequence $P_n$ as follows:

$$P=\{R_1\}==>P_1=\{R_2\}==>P_2=\{R_3\}==>P_3=\{R_n\}==>P_n$$

where $P_i$ is the presentation sequence generated from the presentation sequence $P_{i-1}$ by applying rule $R_i$.

Figure 3:
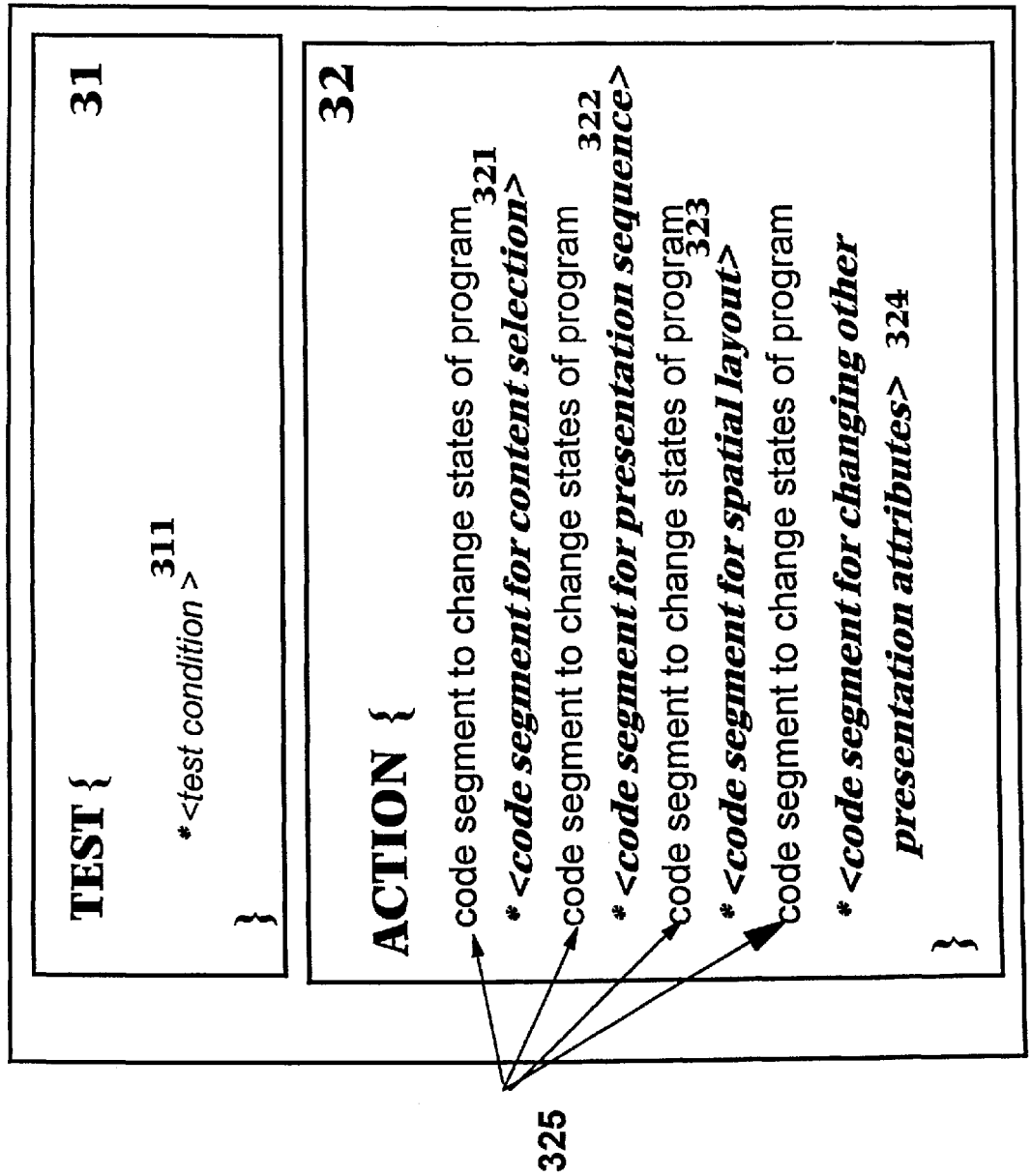
FIG. 3 is a block diagram of a rule of the programmatic presentation generator framework of the present invention.

FIG. 3 shows a block diagram of a rule within the framework of the programmatic presentation generator of the present invention. A rule is a pair of TEST 31 and ACTION 32. TEST 31 specifies the condition 311 to be met for the ACTION to be fired. It can be any predicate over the presentation states such as "if at time $t_i$, a specific image has been presented."

ACTION 32 is a sequence of operations on a presentation sequence to generate a new presentation. These operations can be realized by any code segments using any programming language such as C, PASCAL, JAVA, etc. The operations in an ACTION are preferably composed of four parts 321, 322, 323, 324. The first code segment 321 is to specify the selection of different content data to be included in the presentation. The second is the code segment 322 which specifies different temporal orders of presentation. This code segment uses the operations which will be described in FIGS. 8, 8A, 9, 9A and 9B. The third code segment 323 is to specify the different spatial layouts among different presentation content data. Lastly, there can be code segments 324 for changing presentation attributes, e.g., quality, color, etc. In addition, code segments to change the presentation states 325 (e.g., by utilizing state variables) can be interleaved with the above-mentioned operations. Here, annotations in the input presentation can be monitored and state variables can be adjusted accordingly.

In the application of a rule $R_i$=<TEST,ACTION> to a presentation sequence P, first, it is tested if the condition TEST is met and if so, the code segment ACTION is applied to the presentation sequence P. More mathematically, when the condition TEST is satisfied (is TRUE), an ACTION can be specified as $P_{old}$==ACTION==>$P_{new}$ where $P_{old}$ is the current presentation sequence and $P_{new}$ is the new presentation sequence.

Figure 4:
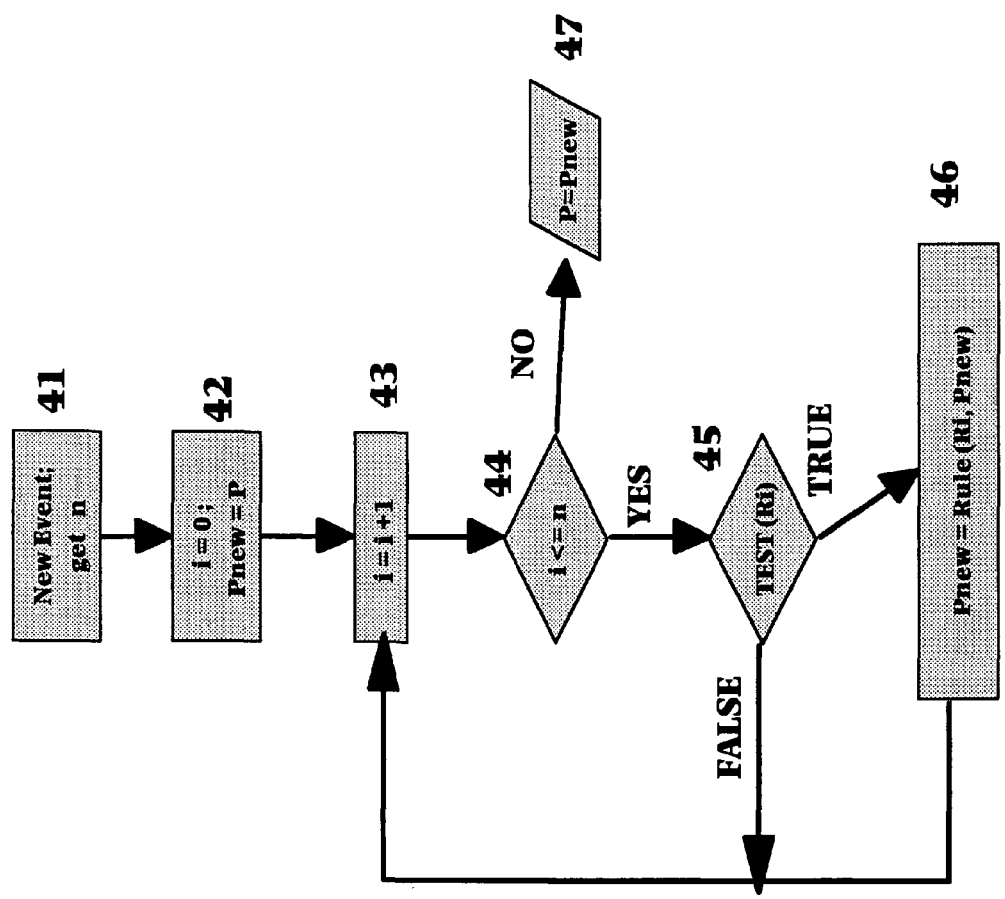
FIG. 4 is a flowchart of the process to generate a presentation sequence according to the present invention.

FIG. 4 is a flowchart illustrating a preferred method for the computation engine 263 to generate a new presentation sequence upon detection of an event. In the diagram, the current presentation is represented by P, the rule-base by $\{R_1, R_2, \ldots, R_n\}$, each rule in the rule-base by $R_i$, the number of rules in the rule-base by n, and the new presentation generated at each computation step by $P_{new}$. In step 41, a new event is sensed and the number of rules, n, in the rule base is received. Next, the engine initializes the index variable i to 0 and initializes the new presentation sequence $P_{new}$ to the current presentation sequence P in step 42. Then, in step 43, the index variable i is increased by 1. In step 44, the index variable i is compared to the number of rules, i.e., n, in the rule-base. If the index variable is greater than the number of rules, the current $P_{new}$ is output as a new current presentation by setting P=$P_{new}$. Otherwise, in step 45, the ith rule, $R_i$ is selected and is tested. If the TEST of $R_i$ is not TRUE, the method proceeds in step 43. Otherwise, if the test of $R_i$ is TRUE, in step 46, the ACTION of $R_1$ is applied to $P_{new}$ to update $P_{new}$. Then, the method continues with step 43.

Figure 5:
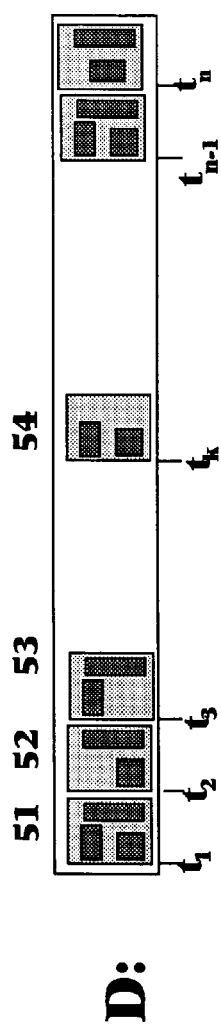
FIG. 5 is a block diagram of a conventional presentation sequence.

FIG. 5 shows a block diagram of a presentation sequence D. The presentation sequence D is composed from a sequence of static objects 51, 52, 53, 54 . . . , etc. and then by assigning the relative time $t_k$ to each static object 51, 52, 53, 54 . . . , etc. in the presentation sequence. A static object is a presentation object without any temporal property. Examples of the static objects include an image, text, a video frame, etc.

Figure 6:
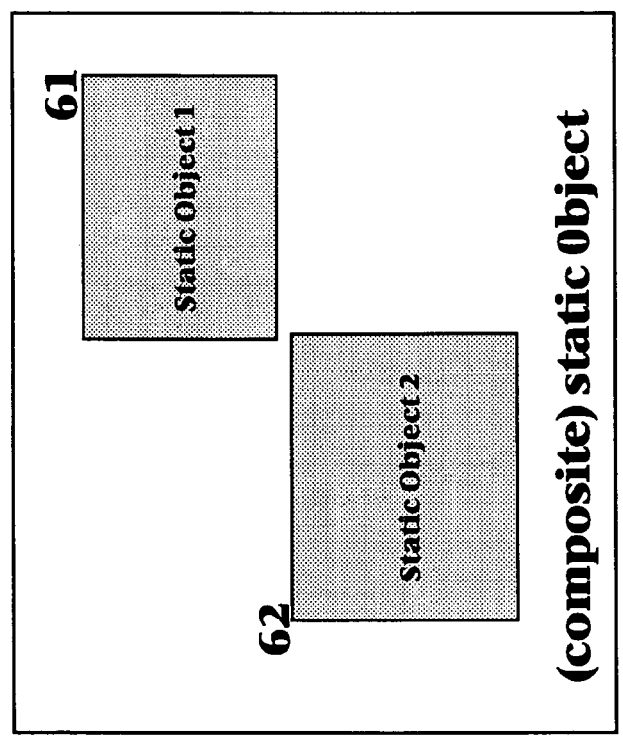
FIG. 6 is a block diagram of a conventional static object.

FIG. 6 shows a block diagram of a composite static object. A composite static object is composed by spatially relating multiple composite objects 61 and 62 on a screen. The description of the spatial relation can be accomplished by using techniques known in the prior art. One such technique can be found in IBM Research Report, Hyperstory, M. Kim and J. Song, 1995.

Figure 7:
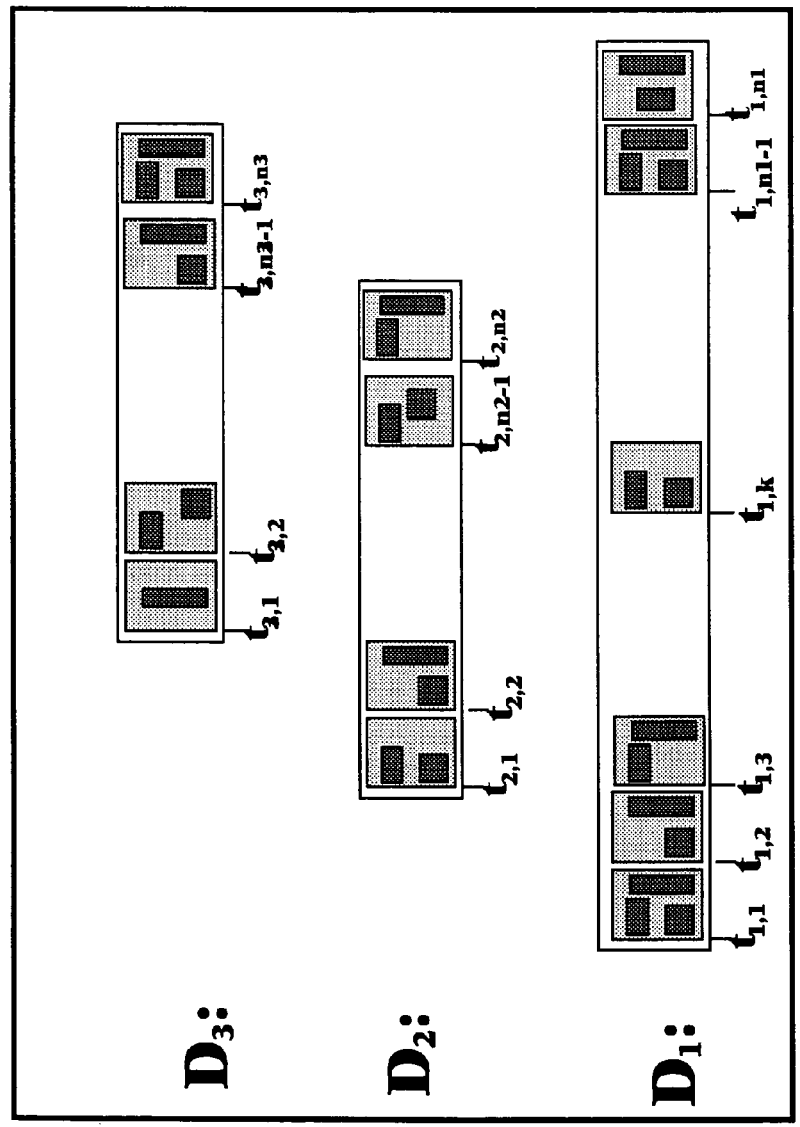
FIG. 7 is a block diagram of a composite presentation sequence of the present invention.

FIG. 7 shows a block diagram of a composite presentation sequence. A composite presentation sequence consists of two or more presentation sequences. The composite presentation sequence in FIG. 7 consists of three presentation sequences D1, D2 and D3.

The operation to create a presentation sequence can be represented by Create, i.e., $$\text{Create}(<(s_1,t_1),(s_2,t_2),\ldots,(s_n,t_n)>).$$

Given a sequence of static objects, $s_1, s_2, \ldots, s_n$, a presentation sequence $<(s_1, t_1), (s_2, t_2), \ldots, (s_n, t_n)>$ is created in which static object $s_i$ is displayed during virtual time interval $(t_i, t_{i+1})$. For example, in FIG. 5, the static object 51 is shown during the virtual time interval $(t_1, t_2)$, and static object 52 is shown during virtual time interval $(t_2, t_3)$, etc.

A presentation sequence can also be generated from one or more existing presentation sequences using temporal operators. A set of temporal operations for the description of temporal property can also be found in "Composition and Search with Video Algebra" by Ron Weiss, Andrej Duda and David K. Gifford in IEEE Multimedia, 1995.

Figure 8:
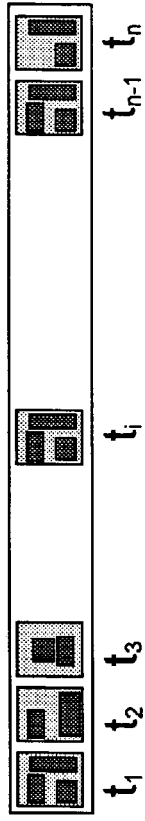
FIG. 8 and FIG. 8A are block diagrams showing the operations to define and change the temporal properties of a presentation sequence according to the present invention.
Figure 8:
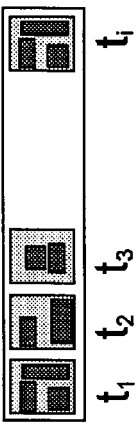
Figure 8:
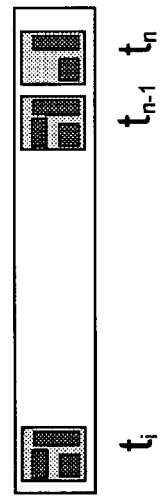
Figure 8:
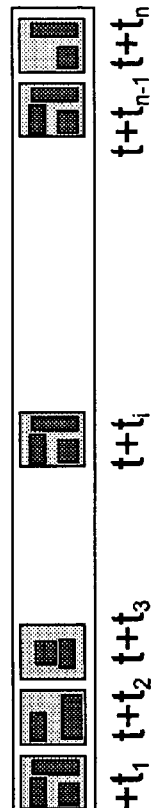
Figure 8A:
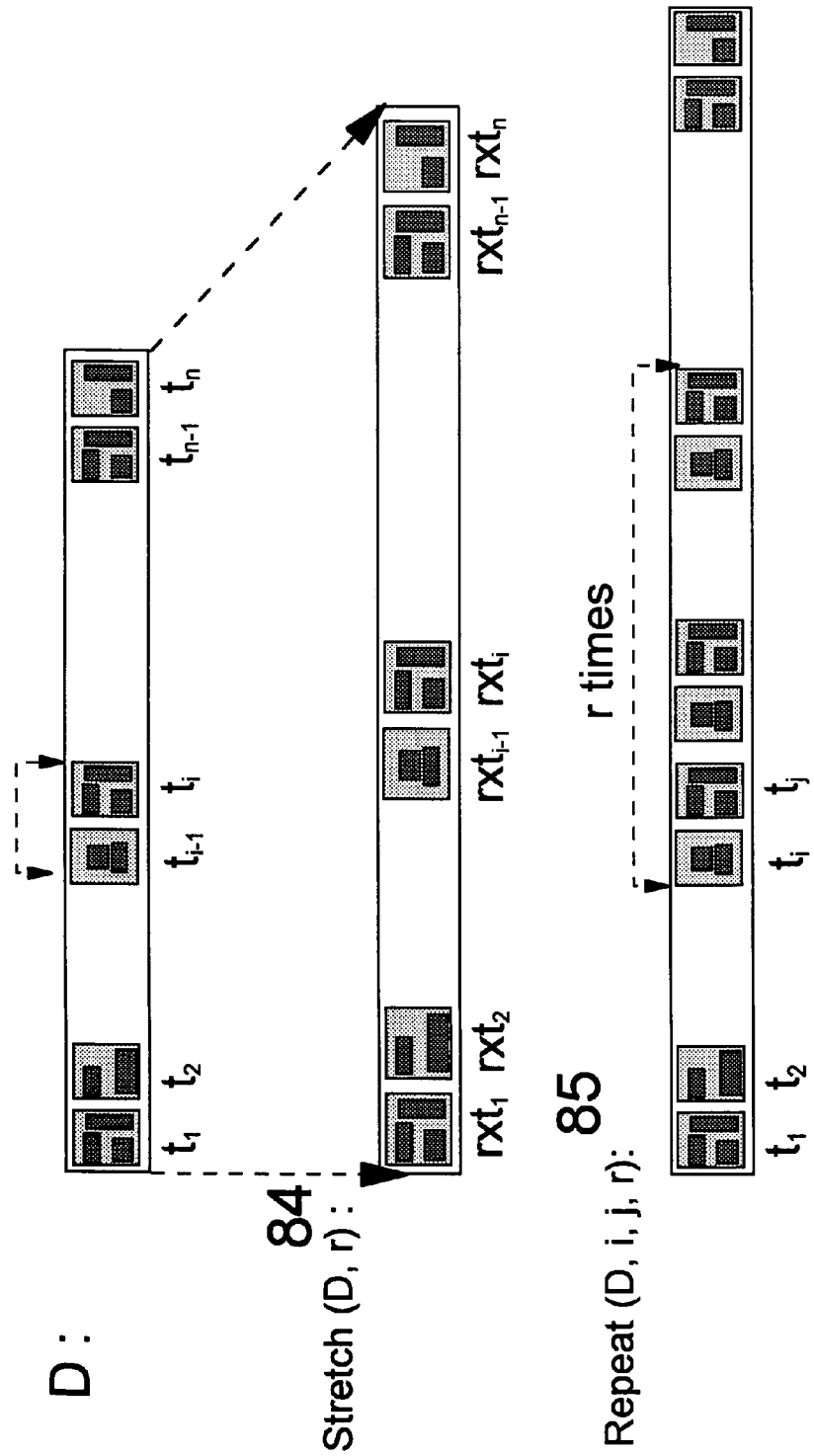

FIG. 8 and FIG. 8A illustrate different operations on a presentation sequence according to the present invention. The intra-sequence operations include:

Head (D,i) 81: Given a presentation sequence $D=<(s_1, t_1), (s_2, t_2), \ldots, (s_n, t_n)>$, a subsequence ending at the ith object is selected as a new presentation sequence. That is, $D_{new}=<(s_1, t_1), (s_2, t_2), \ldots, (s_i, t_i)>$.

Tail (D,i) 82: Given a presentation sequence $D=<(s_1, t_1), (s_2, t_2), \ldots (s_n, t_n)>$, a subsequence starting from the ith object is selected as a new presentation sequence. That is, $D_{new}=<(s_i, t_i), (s_{i+1}, t_{i+1}), \ldots, (s_n, t_n)>$.

Delay (D,t) 83: Given a presentation sequence $D=<(s_1, t_1), (s_2, t_2), \ldots (s_n, t_n)>$, a new presentation sequence $D_{new}$ is created in which the virtual display times are delayed by t virtual time units. That is, $D_{new}=<(s_1, t_1+t), (s_2, t_2+t), \ldots, (s_n, t_n+t)>$.

Stretch (D,r) 84: Given a presentation sequence $D=<(s_1, t_1), (s_2, t_2), \ldots, (s_n, t_n)>$, a new presentation sequence $D_{new}$ is created in which the starting times $t_i$ of static object $s_i$ is scaled to $t_i \times r$, i.e., $D_{new}=<(s_1, t_1 \times r), (s_2, t_2 \times r), \ldots, (s_n, t_n \times r)>$.

Repeat (D,i,j,r) 85: Given a presentation sequence D, a new presentation sequence is created in which the subsequence from $s_i$ to $s_j$ is repeated r times.

Figure 9:
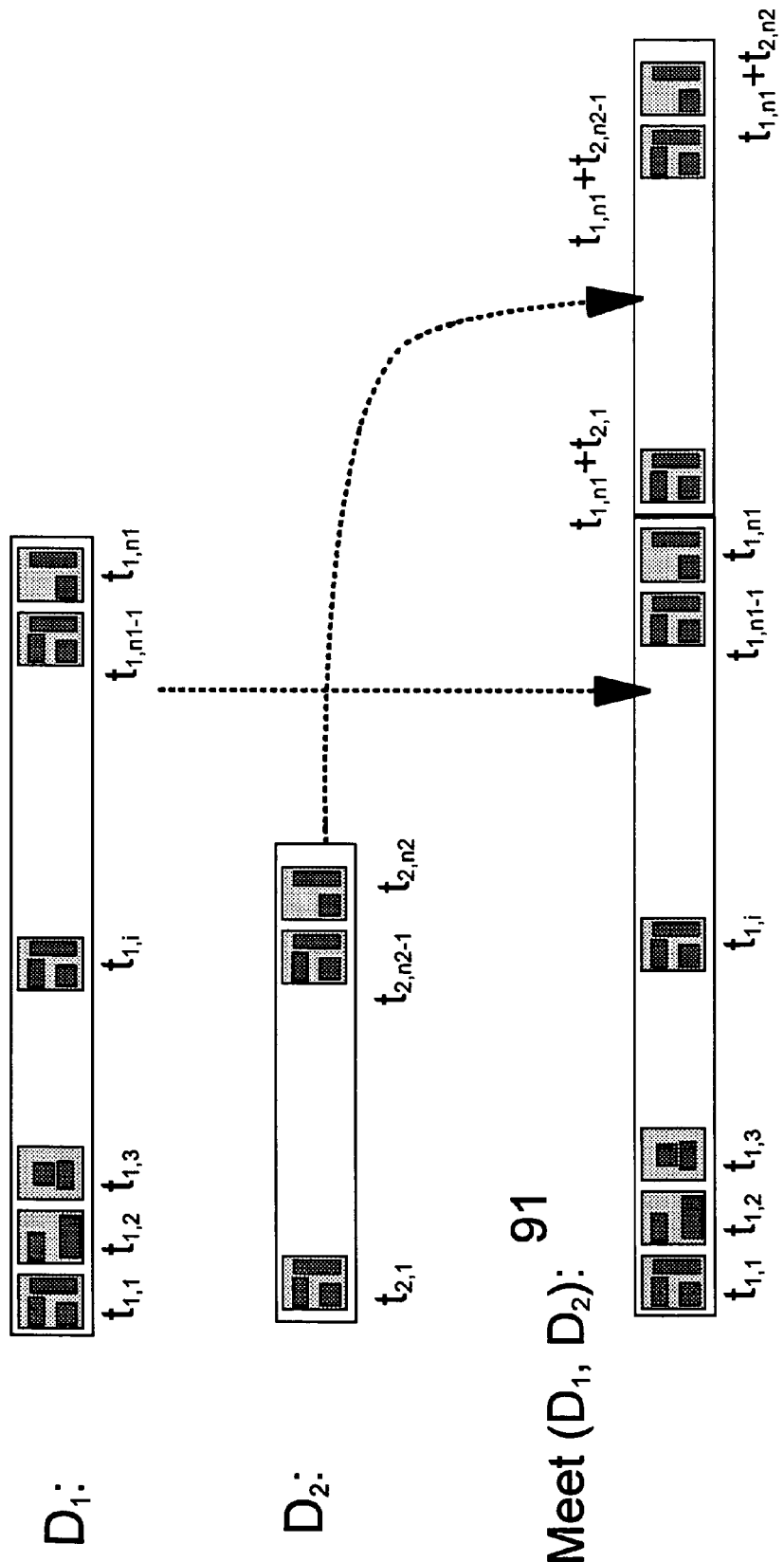
Figure 9A:
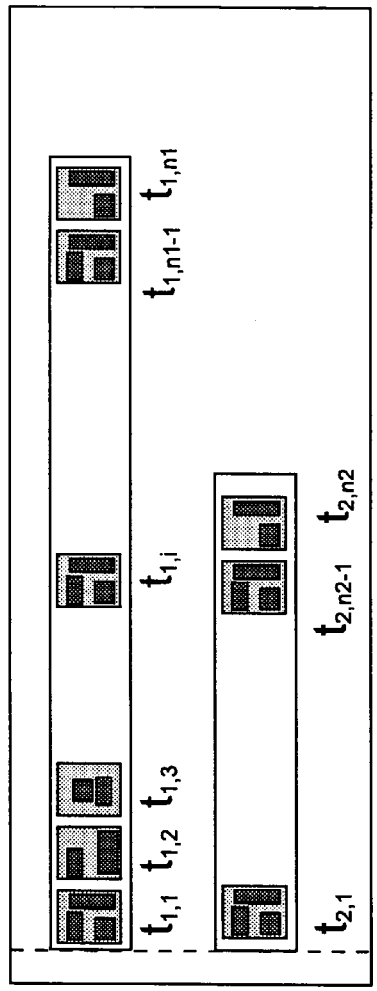
Figure 9A:
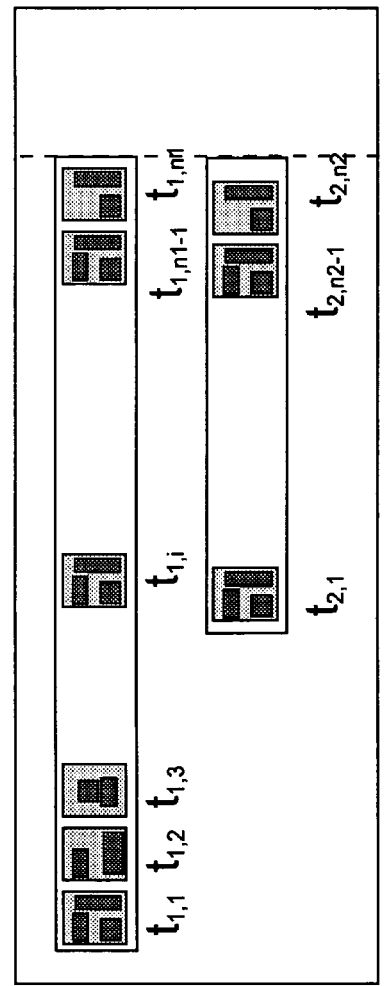

A composite presentation sequence also can be generated by temporally relating multiple presentation sequences (i.e., via inter-sequence operations) according to the present invention. FIG. 9, FIG. 9A, and FIG. 9B show the block diagrams for such inter-sequence temporal operations. They include:

Meet $(D_1, D_2)$ 91: Given two presentation sequences $D_1$ and $D_2$, a new presentation sequence $D_{new}$ is created in which the starting time of $D_2$ is the same as the ending time of $D_1$.

Co-Start $(D_1, D_2)$ 92: Given two presentation sequence $D_1$ and $D_2$, a new presentation sequence $D_{new}$ is created in which the starting time of $D_1$ and $D_2$ are the same.

Co-End $(D_1, D_2)$ 93: Given two presentation sequences $D_1$ and $D_2$, a new presentation sequence $D_{new}$ is created in which the ending time of $D_1$ and $D_2$ are the same.

Interleave $(D_1, D_2, d)$ 96: Given two presentation sequences, $D_1$ and $D_2$, a new presentation sequence is created in which the two sequences are interleaved. Here the parameter d represents the delay in the new presentation sequence of the start time of $D_2$ relative to the start time of the presentation sequence $D_1$.

Given a presentation sequence, a presentation is constructed by associating a start time and a play rate. More mathematically, $P=<D, t_s, r>$ is a presentation where the presentation sequence D is started at real time S with play rate r. Here the start time $t_s$ and the play rate r are used to map virtual times to real times. For example, virtual time $t_i$ is mapped to real time $t_s+t_i \times r$.

Thus, an important feature of the framework of a programmatic generation of a presentation according to the present invention is that the rule-base can be dynamically changed by inserting/deleting/modifying rules and the changes can be dynamically reflected in the generation of a presentation with the engine.

The framework of the programmatic generation of the presentation sequence according to the present invention can be made in either the multimedia server or in the client presentation system or both.

Now that the invention has been described by way of a preferred embodiment, various modifications and improvements will occur to those of skill in the art. Thus, it should be understood that the preferred embodiment is provided as an example and not as a limitation. The scope of the invention is defined by the appended claims.

We claim:

1. A computer-implemented method for programmatic generation of multimedia presentation sequences on a computer, the method comprising:

maintaining a library of rules on said computer, wherein:
    a rule comprises a test and an action, said test specifying a condition for implementing said action,
        said condition corresponding to: if, at time $t_i$, a specific image of a presentation sequence is presented,
    said action comprising a sequence of operations applied to said presentation sequence, wherein said presentation sequence comprises a sequence of static objects, each of said static objects being assigned a relative time, $t_i$, in said presentation sequence and comprising any of an image, text, and a video frame, and
    each of said sequence of said operations comprising one of: specifying a selection of different content to be included in said presentation sequence, and specifying a different temporal order of said presentation sequence;

receiving, by said computer, a previously-generated presentation sequence;

sensing, by said computer, a sensed event, wherein said sensed event includes a timing parameter that determines which rules in said library are applied to said previously-generated presentation sequence;

using said computer to serially apply said rules, determined by said sensed event, to said previously-generated presentation sequence to modify said previously-generated presentation sequence; and outputting, by said computer, said previously-generated presentation sequence that is modified to a monitor for display.

2. A computer-implemented method of modifying a previously-generated presentation sequence on a computer, said method comprising:

maintaining a library of a set of rules based on said computer, wherein:
    each rule of said set of rules comprises a test and an action, said test specifying a condition for implementing said action,
        said condition corresponding to: if, at time $t_i$, a specific image of a presentation sequence is presented, said action comprising a sequence of operations applied to said presentation sequence, wherein said presentation sequence comprises a sequence of static objects, each of said static objects being assigned a relative time, $t_k$, in said presentation sequence and comprising any of an image, text, and a video frame, and each of said sequence of said operations modifying said presentation sequence;

receiving, by said computer, a previously-generated presentation;

sensing, by said computer, a sensed event, wherein said sensed event includes a timing parameter that determines which said set of rules are applied to said previously-generated presentation sequence;

using said computer to serially apply said set of rules, determined by said sensed event, to said previously-generated presentation sequence to automatically modify said previously-generated presentation sequence; and outputting said modified previously-generated presentation sequence from said computer to a monitor for display.

3. The method in claim 2, wherein said modifying comprises changing content of said previously-generated presentation sequence.

4. The method in claim 2, wherein said modifying comprises changing temporal order of sections of said previously-generated presentation sequence.

5. The method in claim 2, wherein said modifying comprises changing spatial layout of said previously-generated presentation sequence.

6. The method in claim 2, wherein said modifying comprises changing presentation attributes of said previously-generated presentation sequence.

7. The method in claim 2, wherein said previously-generated presentation sequence comprises continuous media components.

8. The method in claim 2, wherein said previously-generated presentation sequence comprises audio and video components.

9. A computer-implemented method of creating a composite presentation sequence on a computer from at least two previously-generated presentation sequences, said method comprising:

maintaining a library of a set of rules on said computer, wherein:

each rule of said set of rules comprises a test and an action, said test specifying a condition for implementing said action, said condition corresponding to: if, at time $t_i$, a specific image of a presentation sequence is presented, said action comprising a sequence of operations applied to said presentation sequence, wherein said presentation sequence comprises a sequence of static objects, each of said static objects being assigned a relative time, $t_k$, in said presentation sequence and comprising any of an image, text, and a video frame, and each of said sequence of said operations modifying said presentation sequence;

receiving, by said computer, at least two previously-generated presentation sequences to be combined;

sensing, by said computer, a sensed event, wherein said sensed event includes a user input that determines which said set of rules are applied to said at least two previously-generated presentation sequences;

using said computer to serially apply said set of rules, determined by said sensed event, to said at least two previously-generated presentation sequences, thereby combining said at least two previously-generated presentation sequences into a composite presentation sequence; and outputting said composite presentation sequence from said computer to a monitor for display.

10. The method in claim 9, wherein said combining interleaves said at least two previously-generated presentation sequences.

11. The method in claim 9, wherein said at least two previously-generated presentation sequences include static objects and said combining displays static objects from each of said at least two previously-generated presentation sequences.

12. The method in claim 9, wherein said at least two previously-generated presentation sequences comprise continuous media components.

13. The method in claim 9, wherein said at least two previously-generated presentation sequences comprise audio and video components.

14. The method in claim 9, wherein said at least two previously-generated presentation sequences comprise static components.

* * * * *